(12) United States Patent
Hong

(10) Patent No.: US 11,332,887 B2
(45) Date of Patent: May 17, 2022

(54) TAILINGS-RECLAIMED GREEN STONE PAPER PROCESSING METHOD

(71) Applicant: Kun-Liang Hong, Tainan (TW)

(72) Inventor: Kun-Liang Hong, Tainan (TW)

( * ) Notice: Subject to any disclaimer, the term of this patent is extended or adjusted under 35 U.S.C. 154(b) by 86 days.

(21) Appl. No.: 16/601,990

(22) Filed: Oct. 15, 2019

(65) Prior Publication Data

US 2020/0407919 A1    Dec. 31, 2020

(30) Foreign Application Priority Data

Jun. 26, 2019    (TW) ................. 108122462

(51) Int. Cl.
| | | |
|---|---|---|
| *D21H 13/36* | (2006.01) | |
| *D21B 1/06* | (2006.01) | |
| *D21H 27/00* | (2006.01) | |
| *B29D 7/01* | (2006.01) | |
| *D21H 17/67* | (2006.01) | |

(52) U.S. Cl.
CPC ............ *D21H 13/36* (2013.01); *D21B 1/063* (2013.01); *D21H 27/00* (2013.01); *B29D 7/01* (2013.01); *D21H 17/67* (2013.01)

(58) Field of Classification Search
USPC .............................................. 162/145, 168.1
See application file for complete search history.

(56) References Cited

U.S. PATENT DOCUMENTS

| 9,200,411 | B2 * | 12/2015 | Chen ..................... D21H 27/00 |
| 2011/0306255 | A1 * | 12/2011 | Rathenow ............... C04B 28/26 442/1 |
| 2012/0080156 | A1 * | 4/2012 | Laleg ..................... D21H 17/25 162/158 |
| 2012/0211189 | A1 * | 8/2012 | Huang ................... D21H 13/14 162/168.1 |
| 2014/0135423 | A1 * | 5/2014 | Chou ..................... D21H 17/69 523/125 |
| 2020/0114632 | A1 * | 4/2020 | Shastri ................... B32B 27/18 |

FOREIGN PATENT DOCUMENTS

| CN | 202265444 U | 6/2012 | |
| CN | 107310122 | * 3/2017 | ............... B29C 4/06 |

* cited by examiner

*Primary Examiner* — Mark Halpern
(74) *Attorney, Agent, or Firm* — Rosenberg, Klein & Lee

(57) ABSTRACT

A tailings-reclaimed green stone paper processing method, which treats the tailings to meet the pH 7 pH requirement of the paper standard, grinds the treated tailings after drying, modifies the powdered tailings, implements a modified granulation process with the use of a modification aid, and then implements plastic granule stirring, heating mixing, filament spinning, cutting, papermaking and surface treatment processes to form an environmentally friendly stone fiber paper product, achieving the effects of tailings reuse, pollution-free, moisture-proof, anti-mite and low cost.

9 Claims, 1 Drawing Sheet

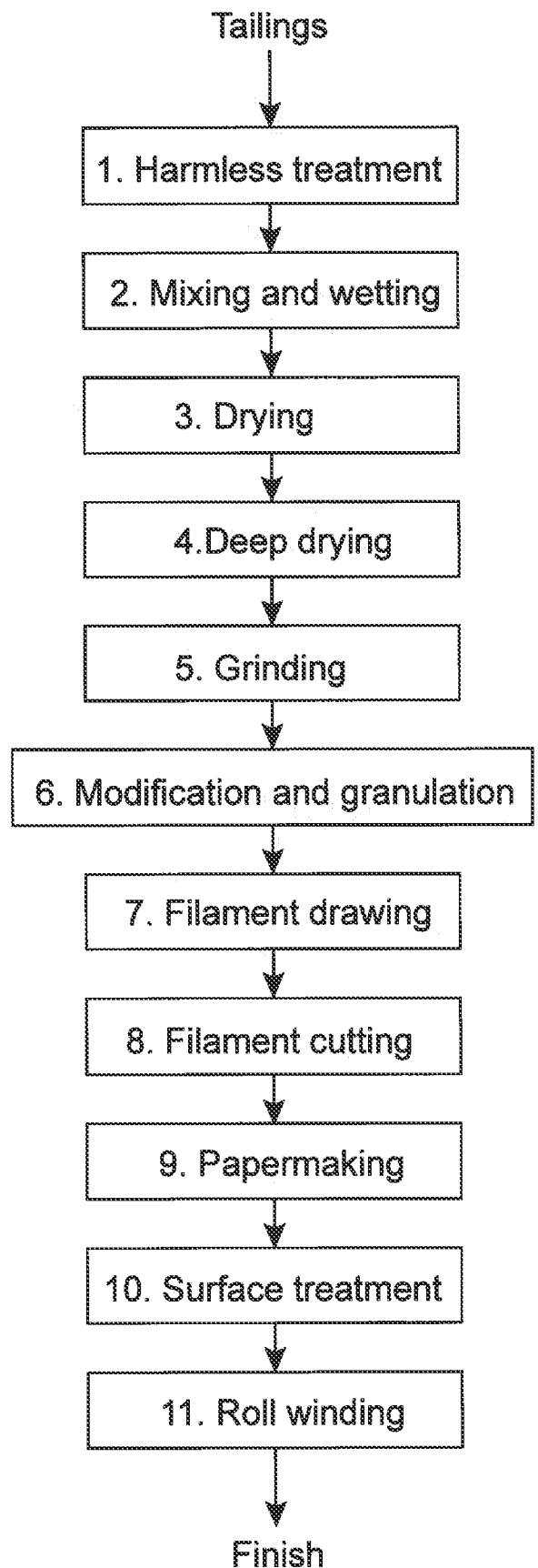

TAILINGS-RECLAIMED GREEN STONE PAPER PROCESSING METHOD

BACKGROUND OF THE INVENTION

1. Field of the Invention

The present invention relates to paper processing technology and more particularly, to a tailings-reclaimed green stone paper processing method.

2. Description of the Related Art

At present, the most commonly used paper is made with the pulp of the woods from water suspension on a wire screen through a pressurization and drying process. In addition to writing, paper is also used for printing, packaging, sanitation, traditional culture (paper-cutting, firecrackers, new year pictures, red envelopes, sky lanterns, etc.), handicrafts (such as sandpaper, tailoring models, paper scales, etc.) and medical services. Papermaking technology originated in China and is of great significance to human civilization. Paper is an indispensable and important item for people's learning and life applications. With the advancement of science and technology to promote the progress of civilization, people's quality of life is improved, the demand for paper continues to increase. However, the implementation of traditional papermaking needs to cut down trees, making forests disappear and causing global greenhouse gas emissions. In the process of papermaking, a large amount of water is used, resulting in waste of water resources. Therefore, the traditional papermaking process will produce a large amount of waste water, waste gas and residual waste, which will cause serious pollution of air, soil and water resources, causing serious damage to people's living environment.

Therefore, some people use stone materials to make stone fiber paper for replacing traditional paper. The technology of making fiber paper from stone materials can solve the problem of the harm caused by traditional paper pollution to the environment. However, due to the large amount of ore mining required for the acquisition of stone materials, natural resources are destroyed, and the harmful substances contained in most stone materials are not properly treated, which will also affect the health of users, and will also cause environmental pollution after disposal.

In the current smelting and beneficiation process, after the process of separating the valuable fraction from the uneconomic fraction of an ore, there will be a portion of the useful target component that cannot be used for production. This part is called tailings.

The tailings that are more difficult to treat mainly include converter stone, red mud, phosphogypsum and molybdenum ore. Specifically, there are strong alkali and heavy metal pollution in converter stone and red mud, strong acid and heavy metal pollution in phosphogypsum, and heavy metal pollution in molybdenum ore. Therefore, if the tailings are not treated and discharged to soil or water, it will cause heavy metal pollution, acidification and alkalization pollution.

In order to solve the above-mentioned problems, it is necessary to open a large amount of ore stone, which will cause damage to natural resources, and the hidden poisons will affect the health of the user and will also cause environmental pollution after disposal.

SUMMARY OF THE INVENTION

The present invention has been accomplished under the circumstances in view. It is therefore the main object of the present invention to provide a tailings-reclaimed green stone paper processing method, which reuses the waste tailings, regulates the pH value of the tailings to neutral (pH7) by adding an acidic substance or an alkaline substance to a neutral electrocatalytic water according to the pH value of the tailings and then mixing the tailings with the acidic or alkaline substance added electrocatalytic water, and treats the heavy metals of the tailings by neutral electrocatalytic water to achieve the purpose of harmless tailings treatment, avoiding environmental pollution after discharge of the electrocatalytic water.

It is another object of the present invention to provide a tailings-reclaimed green stone paper processing method, which reuses the waste tailings to avoid environmental problems caused by abandoned tailings.

It is still another object of the present invention to provide a tailings-reclaimed green stone paper processing method, which is used to make an environmentally-friendly stone fiber paper product, achieving the purposed of tailings reuse, pollution-free, moisture-proof, flood-proof and low cost.

To achieve this and other objects of the present invention, the tailings-reclaimed green stone paper processing method mainly uses an electrocatalytic water device to perform high oxidation-reduction electrocatalytic treatment of tap water, thereby regulating tap water into neutral electrocatalytic water. When the tailings contain strong alkaline pollution, an acidic substance is added to the neutral electrocatalytic water, so that the neutral electrocatalytic water added with the acidic substance and the tailings containing strong alkaline pollution are mixed and reacted to make the strong alkalinity of the tailings be reduced to neutral (pH7). For example, when the tailings contain a strong alkaline pollution pH of 10, the pH of the neutral electrocatalytic water added with the acidic substance is about 4, and the mixed reaction will reduce the strong alkalinity of the tailings to neutral (pH7). On the contrary, when the tailings contain strong acid pollution, an alkaline substance is added to the neutral electrocatalytic water, so that the neutral electrocatalytic water added with the alkaline substance is mixed with the tailings containing strong acid pollution to make the strong acidity of the tailings be reduced to neutral (pH 7), meeting the paper's pH requirements.

For processing tailings containing strong alkaline and heavy metal contamination, the tailings-reclaimed green stone paper processing method includes the steps of: i) detecting the alkaline pH value of the tailings containing strong alkaline and heavy metal pollution, and then adding an acidic substance to the neutral electrocatalytic water of pH 7 regulated by the electrocatalytic water device, and then calculating the pH value of the acidic substance added neutral electrocatalytic water, and then mixing the acidic pH value thus obtained with the tailings containing strong alkali and heavy metal pollution to make the tailings pH neutral, and then stirring and mixing the acidic electrocatalytic water obtained by adding the acidic substance to the above-mentioned calculated intermediate electrocatalytic water and the tailings according to the ratio of solid to liquid volume ratio of 1:1 until the tailings are completely wetted so as to achieve tailings acid and alkali neutralization harmless treatment; ii) mixing the neutral electrocatalytic water of pH 7 with the tailings according to the ratio of solid to liquid volume ratio of 1:1 until the tailings are completely wetted to remove heavy metals so as to achieve tailings heavy metal removal treatment; iii) drying the wet tailings by a natural air drying method or a stirring heating drying device to let the water content be controlled at 60%; iv) putting the tailings into a drying equipment for deep drying at 100° C.-200° C. to let the solid water content be controlled below 1%; v) putting the dried tailings into an ultra-fine grinding equipment for dry grinding to let the grinding precision be controlled between 1000-2500 mesh; vi) mixing tailings powder (specification 1000-2500 mesh) with modifiers and plastic granules at the ratio of 78:2:20 and heating the mixture at 130° C.-200° C. when mixing, and then using a granulation machine to make petrochemical plastic pellets so as to achieve modification and granulation; vii) putting the plastic granules thus obtained into a melt spinning equipment for a drawing process, and winding the filaments thus produced into a filament roll; viii) putting the filament roll into a cutting device for physical cutting into small filaments; ix) mixing the small filaments with starch, water and glue in a mixing machine with a ratio of 1:1:1 for stirring and melting under a heating temperature of 160° C. to form a paper mixture; x) operating a hot pressing roller of a calendar to perform a hot pressing and cooling process so as to make the paper mixture into a green stone fiber paper product; and xi) winding up the environmentally friendly stone fiber paper product by a winding roller so as to achieve the papermaking processing method of tailings reuse, pollution-free, moisture-proof, flood-proof and low cost.

The high redox electrocatalytic water device is to apply the technology of continuously generating high redox water in the prior art, China Utility 201120312616.4, which was invented by the inventor of the present invention. The relevant technical description has been detailed in the specification of the application and will not be described in the present case. The tailings are harmlessly treated by pH 1-2 acid electrocatalytic water to avoid environmental pollution, and the treated electrocatalytic water does not cause pollution after discharge.

Further, the tailings may be calcium sulfate, molybdenum ore tailings, red mud, hearthstone and phosphogypsum. The modifiers include coupling agents, lubricants, antioxidants, UV absorbers, zinc oxide and stearic acid. The plastic granules are selected from PP, PE and PET.

BRIEF DESCRIPTION OF THE DRAWINGS

The FIGURE is a flow block diagram of a tailings-reclaimed green stone paper processing method in accordance with the present invention.

DETAILED DESCRIPTION OF THE PREFERRED EMBODIMENT

Referring to the FIGURE, the present invention provides a tailings-reclaimed green stone paper processing method, which mainly uses an electrocatalytic water device to perform high oxidation-reduction electrocatalytic treatment of tap water, thereby regulating tap water into neutral electrocatalytic water. When the tailings contain strong alkaline pollution, an acidic substance is added to the neutral electrocatalytic water, so that the neutral electrocatalytic water added with the acidic substance and the tailings containing strong alkaline pollution are mixed and reacted to make the strong alkalinity of the tailings be reduced to neutral (pH7). For example, when the tailings contain a strong alkaline pollution pH of 10, the pH of the neutral electrocatalytic water added with the acidic substance is about 4, and the mixed reaction will reduce the strong alkalinity of the tailings to neutral (pH7). On the contrary, when the tailings contain strong acid pollution, an alkaline substance is added to the neutral electrocatalytic water, so that the neutral electrocatalytic water added with the alkaline substance is mixed with the tailings containing strong acid pollution to make the strong acidity of the tailings be reduced to neutral (pH 7), meeting the paper's pH requirements.

The following example is processed with tailings containing strong alkaline and heavy metal contamination. The processing steps are as follows:

1. Firstly, the alkaline pH value of the tailings containing strong alkaline and heavy metal pollution is detected, and the neutral electrocatalytic water of pH 7 regulated by the electrocatalytic water device is added with an acidic substance, and pH value of the acidic substance added neutral electrocatalytic water is calculated. The acidic pH value thus obtained is mixed with the tailings containing strong alkali and heavy metal pollution to make the tailings pH neutral. The acidic electrocatalytic water obtained by adding the acidic substance to the above-mentioned calculated intermediate electrocatalytic water and the tailings are stirred and mixed according to the ratio of solid to liquid volume ratio of 1:1 until the tailings are completely wetted, achieving tailings acid and alkali neutralization harmless treatment.

2. The neutral electrocatalytic water of pH 7 regulated by the electrocatalytic water device is mixed with the tailings according to the ratio of solid to liquid volume ratio of 1:1 until the tailings are completely wetted to remove heavy metals, achieving tailings heavy metal removal treatment.

3. The wet tailings are dried by a natural air drying method or a stirring heating drying device, and the water content is controlled at 60%.

4. The tailings after harmless treatment are put into a drying equipment for deep drying at 100° C.-200° C., and the solid water content should be controlled below 1%.

5. The dried tailings are put into an ultra-fine grinding equipment for dry grinding, and the grinding precision should be controlled between 1000-2500 mesh.

6. Mix tailings powder (specification 1000-2500 mesh) with modifier and plastic granules at the ratio of 78:2:20 and heat the mixture at 130° C.-200° C. when mixing, and then use a granulation machine to make petrochemical plastic pellets, achieving modification and granulation.

7. The plastic granules are put into a melt spinning equipment for a drawing process, and the produced filaments are wound into a roll.

8. Put the filament roll into a cutting device for physical cutting into small filaments.

9. The small filaments are put with starch, water and glue with a ratio of 1:1:1 in a mixing machine for stirring and melting, and the temperature is controlled at 160° C. to form a paper mixture.

10. The paper mixture is formed into a green stone fiber paper product by hot pressing and cooling process of the hot pressing roller of a calendar.

11. Finally, the environmentally friendly stone fiber paper product is wound up by a winding roller to achieve the papermaking processing method of tailings reuse, pollution-free, moisture-proof, flood-proof and low cost.

In the treatment of phosphogypsum tailings with strong acid and heavy metal pollution, an alkaline substance is added to the neutral electrocatalytic water. The alkaline substance added neutral electrocatalytic water is mixed with the tailings containing strong acid pollution, so that the strong acidity of the tailings can be reduced to neutral (pH7) to meet the paper's pH standard. The aforementioned acidic substance may be sulfuric acid, and the alkaline substance may be sodium hydroxide.

Wherein the high redox electrocatalytic water device is to apply the technology of continuously generating high redox water in the prior art, China Utility 201120312616.4, which was invented by the inventor of the present invention. The relevant technical description has been detailed in the specification of the application and will not be described in the present case. The tailings are harmlessly treated by pH 1-2 acid electrocatalytic water to avoid environmental pollution, and the treated electrocatalytic water does not cause pollution after discharge.

Among them, tailings may be calcium sulfate, molybdenum ore tailings, red mud, hearthstone and phosphogypsum. The modifiers include coupling agents, lubricants, antioxidants, UV absorbers, zinc oxide and stearic acid. The plastic granules are selected from PP, PE and PET.

The following are the ratios of various modifiers and plastic granules added during the processing of different tailings:

(1) Calcium sulfate: coupling agent 0.83%, lubricant 1.65%, antioxidant 2.10‰, UV absorber 0.95‰, zinc oxide 0.97‰, stearic acid 0.51%, plastic granules 20%, and the rest is calcium sulphate. Wherein the coupling agent is selected from the group consisting of isopropyl triisostearate, the lubricant is selected from the group consisting of decyl stearate, the antioxidant is selected from the group consisting of tris(2,4-di-tert-butyl phosphite), and the UV absorber is selected from the group consisting of 2,4 dihydroxybenzophenone.

(2) Molybdenum tailings: coupling agent 0.91%, lubricant 1.03%, antioxidant 1.98‰, UV absorber 1.03‰, zinc oxide 1.15‰, stearic acid 0.64%, plastic granules 20%, and the rest are molybdenum tailings. Wherein the coupling agent is selected from the group consisting of isopropyl dimethacrylate, the lubricant is selected from the group consisting of N, N' ethylene double stearin, the antioxidant is selected from the group consisting of tris(2,4-di-tert-butylphenyl)phosphite, and the UV absorber is selected from the group consisting of 2-hydroxy-4-methoxybenzophenone.

(3) Red mud: coupling agent 0.93%, lubricant 1.19%, antioxidant 1.91‰, UV absorber 1.12‰, zinc oxide 1.08‰, stearic acid 0.59%, plastic granules 20%, and the rest is red mud. Wherein the coupling agent is selected from the group consisting of isopropyl phosphonium isopropyl titanate, the lubricant is selected from n-butyl stearate, the antioxidant is selected from the group consisting of tris(2,4-di-tert-butyl phosphite), the UV absorber is selected from the group consisting of 2-(2'-hydroxy-3',5'-di-tert-phenyl)-5-chlorobenzotriazole.

(4) Hearthstone: coupling agent 0.85%, lubricant 1.47%, antioxidant 2.23‰, UV absorber 1.16‰, zinc oxide 0.94‰, stearic acid 0.72%, plastic granules 20%, and the rest is hearthstone. Wherein the coupling agent is selected from the group consisting of isopropyl dimethacrylate, the lubricant is selected from the group consisting of decyl stearate, the antioxidant is selected from the group consisting of tris(2,4-di-tert-butyl phosphite), and the UV absorber is selected from the group consisting of 2,4 dihydroxybenzophenone.

(5) Phosphogypsum: coupling agent 0.92%, lubricant 1.99%, antioxidant 1.85‰, UV absorber 0.93‰, zinc oxide 1.12‰, stearic acid 0.65%, plastic granules 20%, and the rest is phosphogypsum. Wherein the coupling agent is selected from the group consisting of isopropyl triisostearate, the lubricant is selected from the group consisting of erucic acid amide, the antioxidant is selected from the group consisting of tris(2,4-di-tert-butylphenyl) phosphine, and the UV absorber is selected from the group consisting of 2-(2'-hydroxy-3',5'-di-tert-phenyl)-5-chlorobenzotriazole.

The following are the efficacy characteristics of different modifiers:

(1) Coupling agent: a modification aid in the plastic granular compounding for synthetic resin and inorganic filler (tailing powder) or reinforcing material interfacial properties.

(2) Lubricant: Lubricant is used to reduce the frictional resistance between objects of various materials, that is, to reduce the frictional resistance between polymer materials (PP, PE, PET) and inorganic filler materials (tailing powder).

(3) Antioxidant: Antioxidant produces antioxidant effects.

(4) UV absorber: UV absorber absorbs ultraviolet rays to prevent damage caused by ultraviolet rays.

(5) Zinc Oxide: Zinc oxide is a chemical additive. Zinc oxide has a large band gap and exciton binding energy, high transparency, and excellent room temperature luminescence, which makes the product look bright and improves product quality and beauty.

(6) Stearic acid: Stearic acid is used in plastic granules, as a cold-resistant plasticizer, mold release agent, stabilizer and surfactant.

In summary, the present invention is a papermaking processing method having the characteristics of tailings reuse, pollution-free, moisture-proof, flood-proof and low cost.

What the invention claimed is:

1. A method for fabrication of stone fiber paper from waste tailings, comprising:
   (a) obtaining said waste tailings remaining from the stone fiber paper fabrication process which includes a stone material, wherein the waste tailings has an alkaline pH value deviating from a neutral pH7 value and contains heavy metals, and
   (b) treating the waste tailings to obtain a neutralized waste tailings composition having a neutral pH value and free of heavy metals,
   said treating of the waste tailings including:
   (i) detecting the alkaline pH value of the waste tailings remaining from the process of fabricating of the stone fiber paper from the stone material,
   adding an acidic substance or an alkaline substance to neutral electrocatalytic water having a pH 7 value, thus obtaining a mixture of the acidic or alkaline substance with the neutral electrocatalytic water, calculating a pH value of the mixture of the acidic or alkaline substance with the neutral electrocatalytic water, and,
   mixing the mixture of the acidic or alkaline substance and the neutral electrocatalytic water with the waste tailings, thus bringing the acidic or alkaline pH value of the mixture of the waste tailings, the neutral electrocatalytic water, and acidic or alkaline substance to a neutral pH value, and
   stirring and mixing the mixture of the acidic or alkaline substance and the neutral electrocatalytic water with the waste tailings in a volume ratio of a solid waste tailings material content to a liquid content of 1:1 until the solid waste tailings content is sufficiently wetted to obtain a wetted neutralized waste tailings free of the heavy metals;
   (ii) drying the wetted neutralized waste tailings free of the heavy metals by a natural air drying method or by a stirring heating drying device to reach a water content of the wetted neutralized waste tailings free of the heavy metals at a level of 60%;
   (iii deep drying the wetted neutralized waste tailings material free of the heavy metals by a natural air drying method or by a stirring heating drying device to a temperature between 100° C.-200° C. to reduce the water content of the wetted neutralized waste tailings material free of the heavy metals to a level below 1%, thus obtaining a dried neutralized tailings free of the heavy metals;

(iv) entering the dried neutralized tailings free of the heavy metals into an ultra-fine grinding equipment for dry grinding with a grinding precision controlled in a range of between 1000-2500 mesh to obtain a waste tailings powder;

(v) mixing the waste tailings powder with modifiers and plastic granules at a ratio of 78:2:20 and heating a mixture of the waste tailings powder, modifiers, and plastic granules at 130° C.-200° C. while mixing, thereby forming petrochemical plastic pellets of the mixture of the waste tailing powder, modifiers, and plastic granules;

(vi) entering the plastic pellets into a melt spinning equipment for a drawing process, thus obtaining filaments from said plastic pellets, and winding the filaments into a filament roll;

(vii) entering the filament roll into a cutting device for cutting the filaments roll into small filaments;

(viii) mixing the small filaments with starch, water and a glue in a mixing machine with a volume ratio of the starch, water and the glue of 1:1:1 for stirring and melting at a heating temperature level of 160° C. to form a papermaking mixture;

(ix) hot pressing and cooling the paper mixture by controlling an operation of a hot pressing roller of a colander to perform a hot pressing and cooling to transform the papermaking mixture into a fiber paper product; and (x) winding the fiber paper product by a winding roller.

2. The method as claimed in claim 1, wherein a waste tailings material is selected from a group consisting of calcium sulfate, molybdenum tailings, red mud, hearthstone and phosphogypsum, and wherein said modifiers are selected from a group consisting of: coupling agent, lubricant, antioxidant, UV absorber, zinc oxide and stearic acid.

3. The method as claimed in claim 2, wherein said waste tailings material is calcium sulfate, and the modifiers and plastic granules include 0.83% of the coupling agent 1.65% of the lubricant, 2.10‰ of the antioxidant, 0.95‰ of the UV absorber, 0.97‰ of the zinc oxide, 0.51% of the stearic acid, 20% of the plastic granules, and calcium sulphate; and wherein the coupling agent is isopropyl triisostearate, the lubricant is decyl stearate, the antioxidant is tris(2,4-di-tert-butyl phosphite), and the UV absorber is 2,4 dihydroxybenzophenone.

4. The method as claimed in claim 2, wherein said waste tailings material is molybdenum tailings, and the modifiers and the plastic granules include 0.91% of the coupling agent, 1.03% of the lubricant, 1.98‰ of the antioxidant, 1.03‰ of the UV absorber, 1.15‰ of the zinc oxide, 0.64% of stearic acid, 20% of the plastic granules, and molybdenum tailings, and wherein the coupling agent is isopropyl dimethacrylate, the lubricant is N, N' ethylene double stearin, the antioxidant is tris(2,4-di-tert-butylphenyl)phosphite, and the UV absorber is 2-hydroxy-4-methoxybenzophenone.

5. The method as claimed in claim 2, wherein said waste tailings material is a red mud, and the modifiers and the plastic granules include 0.93 of the coupling agent, 1.19% of the lubricant, 1.91‰ of the antioxidant, 1.12‰ of the UV absorber, 1.08‰ of the zinc oxide, 0.59% of stearic acid, 20% of the plastic granules, and red mud, wherein the coupling agent is isopropyl phosphonium isopropyl titanate, the lubricant is n-butyl stearate, the antioxidant is tris(2,4-di-tert-butyl phosphite), and the UV absorber is 2-(2'-hydroxy-3',5'-di-tert-phenyl)-5-chlorobenzotriazole.

6. The method as claimed in claim 2, wherein said waste tailings material is hearthstone, and the modifiers and the plastic granules include the coupling agent at 0.85%, the lubricant at 1.47%, the antioxidant at 2.23‰, the UV absorber at 1.16‰, zinc oxide at 0.94‰, stearic acid at 0.72%, the plastic granules at 20%, and hearthstone, wherein the coupling agent is isopropyl dimethacrylate, the lubricant is decyl stearate, the antioxidant is (2,4-di-tert-butyl phosphite), and the UV absorber is 2,4 dihydroxybenzophenone.

7. The method as claimed in claim 2, wherein said waste tailings material is phosphogypsum, and the modifiers and the plastic granules include the coupling agent at 0.92%, the lubricant at 1.99%, the antioxidant at 1.85‰, the UV absorber at 0.93‰, zinc oxide at 1.12‰, stearic acid at 0.65%, the plastic granules at 20%, and phosphogypsum, and wherein the coupling agent is isopropyl triisostearate, the lubricant is erucic acid amide, the antioxidant is tris(2,4-di-tert-butylphenyl) phosphite, and the UV absorber is 2-(2'-hydroxy-3',5'-di-tert-phenyl)-5-chlorobenzotriazole.

8. The method as claimed in claim 1, wherein said plastic granules are selected from polyethylene (PP), polyethylene (PE) and Polyethylene tenephthalate (PET).

9. The method as claimed in claim 1, wherein said acidic substance is sulfuric acid, and said alkaline substance is sodium hydroxide.

* * * * *